United States Patent
Malden et al.

(10) Patent No.: US 12,204,667 B2
(45) Date of Patent: Jan. 21, 2025

(54) SELECTIVELY GRANTING COMPUTER SYSTEM ACCESS CREDENTIALS TO EXTERNAL USERS AND NON-USERS

(71) Applicant: Elementum Ltd, San Mateo, CA (US)

(72) Inventors: Matthew S. Malden, San Mateo, CA (US); Nader Mikhail, Huntington Beach, CA (US); David Blonski, Brooklyn, NY (US)

(73) Assignee: Elementum Ltd, San Mateo, CA (US)

( * ) Notice: Subject to any disclaimer, the term of this patent is extended or adjusted under 35 U.S.C. 154(b) by 399 days.

(21) Appl. No.: 16/941,382

(22) Filed: Jul. 28, 2020

(65) Prior Publication Data

US 2024/0012919 A1 Jan. 11, 2024

(51) Int. Cl.
*G06F 21/62* (2013.01)

(52) U.S. Cl.
CPC .............. *G06F 21/6218* (2013.01)

(58) Field of Classification Search
CPC ................................. G06F 21/6218
See application file for complete search history.

(56) References Cited

U.S. PATENT DOCUMENTS

| 6,308,273 B1 * | 10/2001 | Goertzel | H04L 9/40 726/2 |
| D681,649 S | 5/2013 | Fletcher et al. | |
| D681,650 S | 5/2013 | Fletcher et al. | |
| D681,651 S | 5/2013 | Fletcher et al. | |
| D681,662 S | 5/2013 | Fletcher et al. | |

(Continued)

FOREIGN PATENT DOCUMENTS

| EP | 3945707 A1 * | 2/2022 |
| JP | 2002281023 A * | 9/2002 |

(Continued)

OTHER PUBLICATIONS

Patkau, Burton H., and David L. Tennenhouse. "The implementation of secure entity-relationship databases." In 1985 IEEE Symposium on Security and Privacy, pp. 230-230. IEEE, 1985. (Year: 1985).*

(Continued)

*Primary Examiner* — Luu T Pham
*Assistant Examiner* — Walter J Malinowski
(74) *Attorney, Agent, or Firm* — WILSON SONSINI GOODRICH & ROSATI

(57) ABSTRACT

Data records associated with an account may be used to track incidents in a supply chain. Incident records associated with a supply chain are accessible and modifiable by users with an active user account associated with an incident management application. The application may receive requests to perform user actions on multiple incidents. Each request may be validated according to account-specific permissions and user-specific privileges. Multiple users may be grouped according to user classes indicative of their status as internal users or external users. Non-users may be invited to perform user actions on incident data through access links generated by the application instance. Access links may allow a non-user to become an invited or registered external user. A registered external user may be promoted to a named external user. Various visibility groups may limit the user actions that any given user of a particular user class can perform on incident data.

18 Claims, 7 Drawing Sheets

(56) References Cited

U.S. PATENT DOCUMENTS

| | | | |
|---|---|---|---|
| D681,670 S | 5/2013 | Fletcher et al. | |
| 8,627,411 B2* | 1/2014 | Li | G06F 21/606 |
| | | | 726/3 |
| 9,503,452 B1* | 11/2016 | Kumar | H04L 63/0838 |
| 10,146,214 B2 | 12/2018 | Linton et al. | |
| 10,296,857 B2 | 5/2019 | Martin et al. | |
| 11,089,028 B1* | 8/2021 | Alpaugh | H04L 63/104 |
| 2002/0147813 A1* | 10/2002 | Teng | H04L 63/0823 |
| | | | 709/225 |
| 2003/0105722 A1* | 6/2003 | Welt | G06Q 40/00 |
| | | | 705/64 |
| 2003/0177025 A1* | 9/2003 | Curkendall | G06Q 10/10 |
| | | | 340/573.3 |
| 2004/0093323 A1* | 5/2004 | Bluhm | G06F 16/9535 |
| 2004/0139044 A1* | 7/2004 | Rehwald | G16H 40/20 |
| 2004/0268038 A1* | 12/2004 | Nagasoe | G06F 3/0623 |
| | | | 711/163 |
| 2005/0210212 A1* | 9/2005 | Nagasoe | G06F 21/80 |
| | | | 714/E11.12 |
| 2007/0067622 A1* | 3/2007 | Nakano | H04L 9/0836 |
| | | | 713/163 |
| 2007/0180259 A1* | 8/2007 | Bulot | H04L 9/085 |
| | | | 713/183 |
| 2008/0010239 A1* | 1/2008 | Nochta | G06Q 10/08 |
| 2009/0307486 A1* | 12/2009 | Grajek | H04L 9/3263 |
| | | | 713/156 |
| 2010/0023387 A1* | 1/2010 | Pan | G06Q 30/02 |
| | | | 705/14.58 |
| 2010/0131973 A1* | 5/2010 | Dillon | H04N 21/6334 |
| | | | 725/120 |
| 2010/0299362 A1* | 11/2010 | Osmond | G06F 21/6218 |
| | | | 707/E17.001 |
| 2010/0306393 A1* | 12/2010 | Appiah | G06Q 10/10 |
| | | | 709/229 |
| 2012/0254946 A1* | 10/2012 | Fleischman | H04L 63/0823 |
| | | | 726/19 |
| 2012/0263111 A1* | 10/2012 | Mochizuki | H04W 36/08 |
| | | | 370/328 |
| 2013/0159836 A1* | 6/2013 | Ferraro | G06F 40/14 |
| | | | 715/738 |
| 2013/0167042 A1* | 6/2013 | Smith | H04L 67/568 |
| | | | 715/753 |
| 2015/0199707 A1* | 7/2015 | Ono | G06Q 30/0641 |
| | | | 705/14.39 |
| 2015/0278500 A1* | 10/2015 | Burch | H04L 63/10 |
| | | | 726/6 |
| 2015/0350221 A1* | 12/2015 | Espinosa | G06F 21/6245 |
| | | | 726/4 |
| 2016/0217399 A1 | 7/2016 | Roelofs et al. | |
| 2016/0323262 A1* | 11/2016 | Tan | G06F 21/10 |
| 2017/0034177 A1* | 2/2017 | Narasimhan | G06Q 50/265 |
| 2017/0102833 A1* | 4/2017 | Kodali | G06F 9/45504 |
| 2018/0121559 A1* | 5/2018 | Bare | G06F 16/252 |
| 2018/0295126 A1* | 10/2018 | Gilpin | H04L 63/102 |
| 2019/0207807 A1 | 7/2019 | Mikhail et al. | |
| 2020/0104958 A1* | 4/2020 | Cheng-Shorland | |
| | | | G06Q 10/101 |
| 2020/0412726 A1* | 12/2020 | Nevatia | G06F 21/604 |
| 2021/0075795 A1* | 3/2021 | Liu | H04L 63/083 |
| 2021/0279726 A1* | 9/2021 | Kita | H04L 9/50 |
| 2021/0297945 A1* | 9/2021 | Ergen | H04W 48/20 |
| 2021/0349888 A1* | 11/2021 | Barta | G06F 16/9535 |
| 2023/0185826 A1* | 6/2023 | Kuruganti | G06F 16/273 |
| | | | 707/614 |

FOREIGN PATENT DOCUMENTS

| | | | | |
|---|---|---|---|---|
| JP | | 3651998 B2 * | 5/2005 | |
| JP | | 2009296494 A * | 12/2009 | |
| WO | WO-2013049640 A1 | | 4/2013 | |
| WO | WO-2014008386 A2 | | 1/2014 | |
| WO | WO-2015077756 A1 * | | 5/2015 | G06F 9/45558 |
| WO | WO-2016025905 A1 | | 2/2016 | |
| WO | WO 2017/125509 | | 7/2017 | |
| WO | WO-2017125509 A1 * | | 7/2017 | G06Q 10/101 |

OTHER PUBLICATIONS

Chaudhuri, Surajit, Tanmoy Dutta, and S. Sudarshan. "Fine grained authorization through predicated grants." In 2007 IEEE 23rd International Conference on Data Engineering, pp. 1174-1183. IEEE, 2006. (Year: 2006).*

Obelheiro, Rafael R., and Joni S. Fraga. "Role-based access control for CORBA distributed object systems." In Proceedings of the Seventh IEEE International Workshop on Object-Oriented Real-Time Dependable Systems. (WORDS 2002), pp. 53-60. IEEE, 2002. (Year: 2002).*

Ambhore, Premchand B., B. B. Meshram, and V. B. Waghmare. "A implementation of object oriented database security." In 5th ACIS International Conference on Software Engineering Research, Management & Applications (SERA 2007), pp. 359-365. IEEE, 2007. (Year: 2007).*

Moniruzzaman, Md, and Ken Barker. "Delegation of access rights in a privacy preserving access control model." In 2011 Ninth Annual International Conference on Privacy, Security and Trust, pp. 124-133. IEEE, 2011. (Year: 2011).*

Sampemane, Geetanjali, Prasad Naldurg, and Roy H. Campbell. "Access control for active spaces." In 18th Annual Computer Security Applications Conference, 2002. Proceedings., pp. 343-352. IEEE, 2002. (Year: 2002).*

European Patent Office "Search Report", in Application No. 21187808.7-1218, dated Dec. 2, 2021, 9 pages.

* cited by examiner

SELECTIVELY GRANTING COMPUTER SYSTEM ACCESS CREDENTIALS TO EXTERNAL USERS AND NON-USERS

FIELD OF THE DISCLOSURE

One technical field of the present disclosure is computer data security in networked data storage. Another technical field is computer-implemented system access control, including techniques for selectively granting access credentials for a computer system to external users and non-users.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Supply chains involving manufacturers, carriers or other logistics providers, distributors and retailers have become widely distributed on a global basis and increasingly complex. The effectiveness with which entities in a supply chain create and share information has come to define how well the supply chain holds together, how efficiently it operates, and how much value it provides. In some cases, effective information sharing also determines the success or failure of a manufacturing venture. Companies need to share supply metrics, timelines, demand data, and capacity data to enable the supply chain to develop a common and aligned set of objectives, which can protect it against commodity pressures and volatility, as well as individual failures of entities or adverse events such as weather, natural disaster or pandemic. Sharing information can speed up supply chains while mitigating the inherent risks in doing so.

An incident can cause disruptions to a supply chain. An example might be a mechanical problem with a container ship that causes it to divert to a different port instead of going straight to its destination port. Another example is a natural disaster that the container ship encounters in transit. In those cases, buyers and suppliers who participate in an otherwise closed, a secure computer system may want third parties to have access to all records about a transaction or a subset of all records data. For example, if a diesel engine contractor is fixing the wayward ship, buyers and suppliers may want the contractor to update a record in an otherwise closed, secure system as to when the ship is cleared to sail. Afterward, the buyers and suppliers may want to rescind access by the contractor or prevent the contractor from seeing any data.

A supply chain management system may be used to manage information for supply and logistics chains, including incident records. The incident for a particular supply chain may be owned by a particular account, such as a party along the supply chain. Each incident that occurs in the supply chain may only be accessed by users of the account that owns the incident. However, users of the account may need to collaborate with other individuals that are not part of the account in order to resolve an incident or may want the other individuals to be aware of or be informed of the incident and its status.

One solution may be to add the other individuals as users under the account owning the incident. However, doing so may grant visibility to other incidents under the account, which may not be relevant to the other individuals or that the account owner may not wish the other individuals to have access to. Additionally, the account owner would have to manage the users that have been added and remove users when access is no longer required, or when the relevant incident has been resolved. This amplifies the concern that users external to an account may retain access to information that they should not have access to.

Therefore, techniques are desired for providing third-party users selective access to individual incidents in a supply chain management system.

SUMMARY

The appended claims may serve as a summary of the invention.

DETAILED DESCRIPTION

Figure 1:
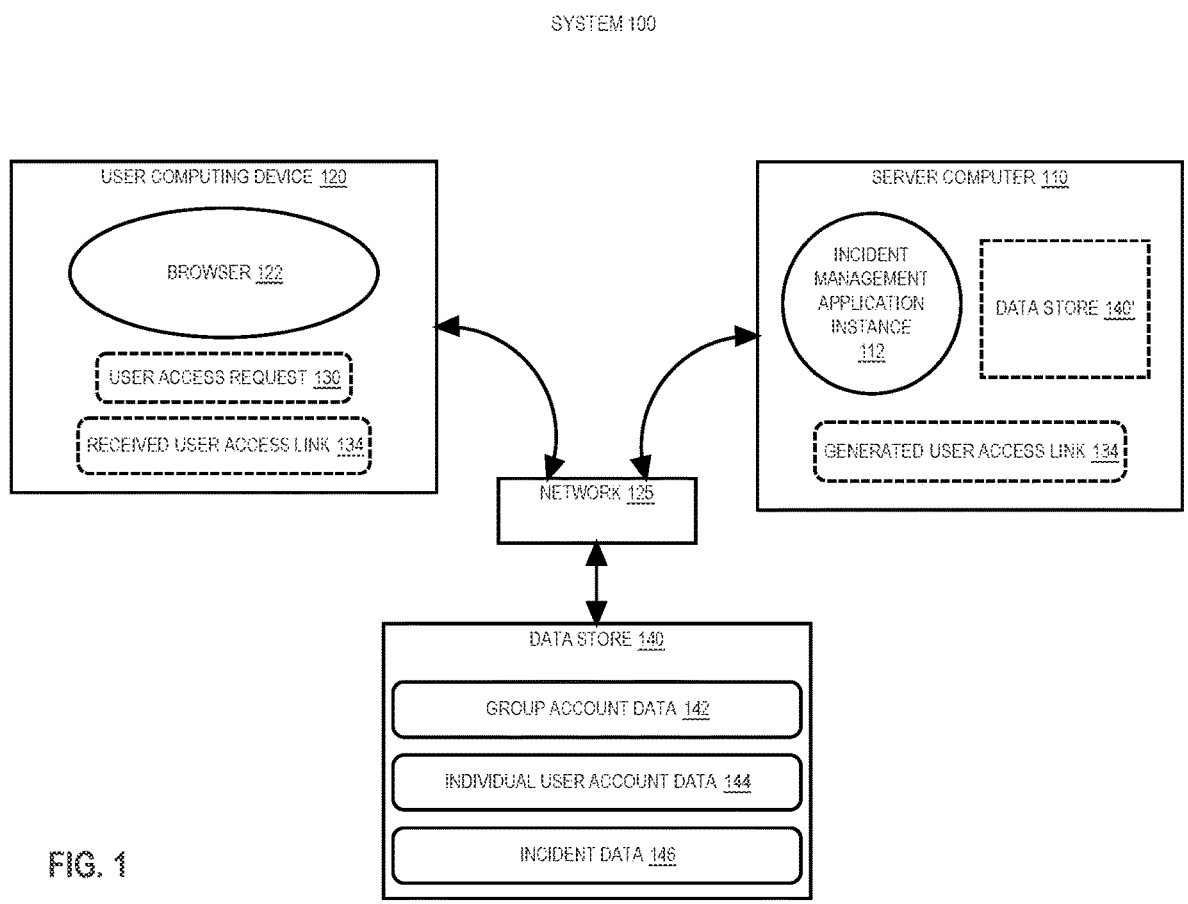
FIG. 1 illustrates an example computer system in which the techniques described herein may be practiced, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described in sections according to the following outline:

1. GENERAL OVERVIEW
2. DISTRIBUTED COMPUTER SYSTEM OVERVIEW
3. ACCESS PERMISSIONS OVERVIEW
4. REPORTS AND CONTROLS FOR INTERNAL, EXTERNAL, AND NON-USERS
5. REPORTS AND CONTROLS FOR ADMINISTRATORS
6. VALIDATING ACCESS REQUESTS
7. EXTERNAL ACCESS METHODS
8. REMOVING ACCESS FROM EXTERNAL AND NON-USERS
9. IMPLEMENTATION EXAMPLE—HARDWARE OVERVIEW

1. GENERAL OVERVIEW

This disclosure generally describes techniques for integrating external users and non-users into a computer system on a selective basis and controlling what data the non-users may see and how they interact with the data. "Users" in this context, is not intended to refer to persons or individual human action but refers broadly to user accounts and user computing devices such as desktop computers, workstations, laptop computers, tablet computers, smartphones, or other mobile computing devices that have access to the computer system.

In some embodiments, the computer system may manage data for a plurality of groups. A "group" may be any unit, domain, network, organization, or entity that a set of users may belong to, based upon a legal organization, control, operations, geographical or physical location, or other factors. In the context of a supply chain management system, a group may be associated with a particular supply chain, a portion of a particular supply chain, or a business enterprise, corporation, partnership, or other entity that owns or is part of a particular supply chain.

Additionally, one or more users may belong to each group. Access to data associated with a group may be limited to users that belong to the group ("internal users"). In some embodiments, granting access to data associated with the group can include granting access to users that do not belong to the group ("external users"). Additionally, in certain embodiments, access to data associated with the group can include granting access to "non-users" who are not users of the computer system, and do not have access credentials for the computer system, nor are they users of the group.

In an embodiment, the data associated with the group comprises a plurality of data records. Granting access to the data to external users and non-users comprises granting access to a particular data record of the plurality of data records. In response to a request to grant an external user or non-user access to a particular data record, the computer system may generate and store access data associating the external user or non-user with the particular data record. Generated and stored access data may be deleted, and associated access privileges revoked, if a request to unsubscribe the external user or non-user from the incident is received.

In an embodiment, when the computer system receives a request to access data associated with the group by an external user or non-user, the computer system determines a particular non-user or external user associated with the request and a particular data record targeted by the request. The computer system may validate the request based on whether the particular external user or non-user has been granted access to the particular data record.

2. DISTRIBUTED COMPUTER SYSTEM OVERVIEW

FIG. 1 illustrates an example computer system in which the techniques described may be practiced, according to one embodiment.

In an embodiment, a computer system 100 comprises components that are implemented at least partially by hardware at one or more computing devices, such as one or more hardware processors executing stored program instructions stored in one or more memories for performing the functions that are described herein. In other words, all functions described herein are intended to indicate operations that are performed using programming in a special-purpose computer or general-purpose computer, in various embodiments. FIG. 1 illustrates only one of many possible arrangements of components configured to execute the programming described herein. Other arrangements may include fewer or different components, and the division of work between the components may vary depending on the arrangement.

Furthermore, FIG. 1, and the other drawing figures and all of the description and claims in this disclosure, are intended to present, disclose and claim a technical system and technical methods in which specially programmed computers, using a special-purpose distributed computer system design, execute functions that have not been available before to provide a practical application of computing technology to the problem of selectively granting computer system access credentials to external users and non-users. In this manner, the disclosure presents a technical solution to a technical problem, and any interpretation of the disclosure or claims to cover any judicial exception to patent eligibility, such as an abstract idea, mental process, method of organizing human activity or mathematical algorithm, has no support in this disclosure and is erroneous.

In FIG. 1, computer system 100 comprises server computer 110 and user computing device 120. Server computer 110 and user computing device 120 may be interconnected to one another using any suitable data communication mechanism such as one or more data networks, represented by network 125. The one or more data networks may include one or more local area networks (LANs), one or more wide area networks (WANs), one or more internetworks such as the public Internet, or a company network.

User computing device 120 may be any computing device, including but not limited to: servers, racks, workstations, personal computers, general-purpose computers, laptops, Internet appliances, wireless devices, wired devices, multi-processor systems, minicomputers, and the like. Although a single user computing device is depicted in FIG. 1, any number of user computing devices may be present. Each user computing device 120 is communicatively connected to server computer 110 through network 125. User computing device 120 also includes other hardware elements, such as one or more input devices, memory, processors, and the like, which are not depicted in FIG. 1. User computing device 120 also includes applications, software, and other executable instructions to facilitate various aspects of embodiments described herein.

User computing device 120 may execute software, applications, or other program instructions for interacting with server computer 110. In the illustrated example, the user computing device 120 is executing a browser 122. Browser 122 may execute or include instructions, such as a webpage or a plug-in, that is programmed or configured to interact with server computer 110. The software, applications, or other program instructions are programmed or configured to request data from server computer 110, such as incident data 146. Additionally, the software, applications, or other program instructions may be programmed or configured to display data received from server computer 110, receive user input for modifying or updating the data, and send requests to modify or update data to server computer 110. The software, applications, or other program instructions may also be programmed or configured to send requests to modify or update access permissions for a group and requests to grant access to or remove access from an external user or non-user.

Server computer 110 may be any computing device, including but not limited to: servers, racks, workstations, personal computers, general-purpose computers, laptops, Internet appliances, wireless devices, wired devices, multi-processor systems, minicomputers, and the like. Although FIG. 1 shows a single element, the server computer 110 broadly represents one or multiple server computers, such as a server cluster, and the server computer may be located in one or more physical locations. Server computer 110 also may represent one or more virtual computing instances that execute using one or more computers in a data center such as a virtual server farm.

In the illustrated embodiment, server computer 110 is communicatively coupled to data store 140. In one embodiment, data store 140 may be any suitable storage device such as one or more hard disk drives, memories, or any other electronic digital data recording device configured to store data. Although data store 140 is depicted as a single device in FIG. 1, data store 140 may span multiple devices located in one or more physical locations. For example, data store 140 may be one or more nodes of one or more data warehouse(s). Additionally, in one embodiment, data store 140 may be located on the same device(s) as server computer 110. Alternatively, data store 140 may be located on a separate device(s) from server computer 110. Additionally, data storage devices may be located on each client device 120 associated with a computing system, such as an enterprise or work computing system. Any combination of the above may be used, depending on the implementation.

In some embodiments, data stored in data store 140 includes group account data 142, individual user account data 144, and incident data 146. In this context, incident data 146 may refer to data for any object type, including incidents, tasks, approvals, or others, as described in further detail herein. Group account data 142 may include, for example, account details, status information, internal users, named external users, guest users, visibility groups, account creation date, account activity information, and access permissions information. User account data 144 may include, for example, user account information, user account status, notification settings, and accessible incident information. When changes to attributes of users or accounts, user permissions, external access settings of the account, or any other changes are referred to in the descriptions below, it may be understood that some data in data store 140 is being changed to reflect or indicate these changes. Similarly, when determinations are made regarding the validity of access or modification requests, or the permissibility of adding a user to a particular account or accessing an incident, these determinations may be made on the basis of comparing data values in the data store 140 to validate requests for user action or addition on the basis of various user permissions and account access/visibility settings. Additionally, each user may be associated with a particular account and associated as either a named internal user or named external user. Incident data 146 may include, for example, incident status information, incident details such as fields and attribute values, incident assignees, and incident followers. Additionally, each incident may be associated with a particular account and one or more particular users.

A user or a non-user may be provided access to incident data 146 in multiple ways. A master group administrator can name a user or non-user to be a named internal user of the group associated with the incident data 146. An external user or non-user can be added to an incident, as a "follower" of the incident, by an internal user or, in certain cases, a named external user.

In FIG. 1, server computer 110 is executing supply chain incident management application 112. In an embodiment, supply chain incident management application 112 comprises program instructions that are programmed or configured to receive requests to grant an external user or non-user access to incident data managed by a group account, determine whether the external user or non-user may be granted access to the incident data, and create and store access permission information in association with the request. Supply chain incident management system may be a network management system that can display, to a user computing device 120, information representing risk and/or impact associated with an incident or event, disrupting the network or supply chain.

Additionally, supply chain incident management application 112 may be programmed or configured to, in response to granting the external user or non-user access to the incident data, generate a user access link 134 corresponding to the external user or non-user. The generated user access link 134 may be a web link, a URL, or any other suitable communications link that enables an external user or non-user to communicate over network 125 with incident management application instance 112 that manages data store 140 or 140'. The link may be used by the external user or non-user to send a request to server computer 110 to grant them access to the incident data 146. The link may be generated and sent to the external user or non-user in response to that external user or non-user being added as a follower to the incident, by an existing user or administrator.

There are a number of examples of events or "incidents" that can impact the performance of a selected supply or logistics chain, represented by an "account." Incidents can include, for example, natural disasters, weather patterns, political disruptions, criminal actions, violence, delays by or disruptions to logistics providers, energy shortages, disruptions, or blackouts, business disruptions (e.g., device or system malfunction, labor disruption, lawsuit, financial insolvency, public announcement by a partner or competitor, scheduled event or holiday, and/or a health event. Examples that could occur, and could be processed or represented in the system as incident data, include one or more of an earthquake, tsunami, volcanic eruption, fire, flood, avalanche, landslide, storm, typhoon, hurricane, cyclone, tornado, wind, flood, blizzard, coup, revolution, insurrection, changes or upheavals, sabotage, terrorism, act of war, military action, police action, embargo, and blockade, piracy, hijacking, theft, arson, vandalism, and the like, acts of terrorism, war, political upheaval, military action, and the like, railroad derailment, maritime vessel sinking, airplane crash, freight embargo, freight vehicle wreck, naval blockades and the like, strikes or threatened strikes, religious, political, or other holidays, health emergency, illness, death, pandemic and so forth.

In an embodiment, supply chain incident management application 112 may be programmed or configured to, in response to receiving a request 130 from a user computing device 120 to allow a user to access incident data, determine that the request is for a particular external user or non-user and validate the request. In response to receiving and validating the request, the supply chain incident management application may provide access to the incident data to user computing device 120 via a user access link 134 that is generated at the server computer 110 and sent to the user computing device 120. Access link 134 may be a link to stored incident data 146, stored on a data store 140 that is accessible via network 125. Data store 140' may represent an embodiment where the data 142, 144, and 146 reside on storage resources of the server computer 110. Alternatively, or additionally, server computer 110 may send requested incident data to the user computing device 120 directly, in response to receiving a valid user request 130 for the information.

Responsive to receiving the access link, a user may open the access link. Opening the access link may refer to using the link to access the linked incident data 146. Opening the access link may generate a request for the particular incident data that the user is a follower of. Opening the access link may cause the application instance 112 to validate the access link and determine if it is still valid. This is mentioned further in connection with step 604 of FIG. 6 below. If this validation fails, the user is not granted access to the incident data.

The various servers and sources, such as server computer 110, user computing device 120, and data store 140 are connected by a network 125, representing a circuit and/or packet-switched wide area network ("WAN") that covers a broad area (e.g., any telecommunications network that links across metropolitan, regional, or national boundaries) using private and/or public network transports. An exemplary WAN is the public Internet. While the supply and/or logistics chain is described primarily with reference to manufacturing and distribution of a product, it can be applied equally to warranty and/or repair or maintenance services and logistics and procurement operations. The term "supply and/or logistics chain(s)" and variations thereof are intended to encompass these other types of operations.

Although examples are described herein with reference to a supply chain management application and incident data, the present techniques are not limited to any particular type of data or to any particular type of applications. The techniques described herein may be used by any system or application that requires granting external users or non-users selective access to data stored and managed by the system.

2.1 INDEX OF TERMS

An "account" may refer to information associated with an individual user or group of users with access to an incident management computer system or application. The account may be associated with an enterprise user or group, an organization user or group, or a supply chain user or group. An individual user account may be associated with an individual who accesses the incident management application 112 using an access link 134 received at browser 122 on user computing device 120. An access link 134 may provide a user an interface at browser 122 to access incident data 146. In certain situations where the allows, access link 134 may allow a user to modify incident data 146.

A group account may be associated with multiple individuals, or users, belonging to an entity or group as defined above, who similarly access the incident management application. Access links or access data associating a user with an incident, may be generated by incident management application instance 112 responsive to receiving a valid request. A user access request 130 may be generated by browser 122 and conveyed to incident management application instance 112 over network 125. Application instance 112 may then validate the user access request 130 by consulting data store 140. Data store 140' represents an embodiment in which the contents of data store 140 are stored on storage resources of server computer 110.

Individual user account data 144 may include information about the individuals authorized to access incident data 146 managed by application instance 112. Group account data 142 may include information about the multiple individuals, or users, belonging to an entity or a group who are authorized to access incident data 146 managed by application instance 112. An individual user or a user belonging to a group may be authorized to access incident data 146 via application instance 112 as an internal user, an external user, or a non-user.

Individual user account data 144 may be a collection of all the internal users and external users. Group account data 142 may contain information about groups, and which of the individual user accounts specified in data 144 belong to each of the respective groups.

A master administrator may designate a user as an internal user. An example of this is mentioned further below in connection with the master administrator GUI 402 of FIG. 4. Incident data 146 may be viewable by all internal users of the group of users associated with the particular incident data 146. As an example, a particular incident may be associated with an Enterprise group account, an Organization group account, or a Supply Chain group account. Not all individual user accounts belonging to one of the group accounts associated with the particular incident may have the same access privileges for incidents associated with the group account. Internal users of a particular group account may have access privileges for all incidents associated with the particular group account.

In addition to internal users, a particular group account may have associated external users. "External users" may refer to any of external users, named external users, guest users, registered external users, invited external users, and non-users. In this context, "guest users" may refer to registered external users, invited external users or non-users.

Named external users may be pre-specified, or "named" by a group account administrator. External users that are "named" may be asked to generate login credentials. Or, they may be asked to use provided login credentials. Using the login credentials, a named external user, provided they have access to the incident data, can access incident data 146 managed by application instance 112. Login credentials may be used to validate access requests to the incident data from the named external user. Access data stored in the group account data 142 may be used to validate a named external user's login credentials. Internal users may similarly use login credentials to access incident data 146.

An external user who is not a named external user, such as any of the guest users, invited external users, and non-users, may be provided access credentials as well. As an example, unregistered invited external users or non-users may use a registration process to create login credentials, depending upon the associated external access setting. A user may be provided the opportunity to create login credentials via an access link, which can be sent via an email invitation link.

Access credentials for users may not always be in the form of login credentials. Access data associating a user to an incident, as a "follower" can take the form of a user-specific login name or email address, or user-specific access data stored on data store 140. User-specific access data may be created by step 506 of the process of FIG. 5.

3. ACCESS PERMISSIONS AND VISIBILITY GROUP OVERVIEW

In an embodiment, each individual user account may be associated with or belong to a particular group account of a plurality of group accounts managed by server computer 110. An individual user account may have access to incident data that is associated with the particular group account, but may not have access to incident data that is associated with other group accounts that the individual user account does not belong to. Thus, the user may be referred to as an "internal user" with respect to the particular group and an "external user" with respect to the other, non-associated group.

In an embodiment, each incident is associated with respective account access permissions. The incident access permissions indicate whether external users and non-users are allowed to access data managed by the account. Additionally, if external users or non-users are allowed to access the group account data, the access permissions may also restrict data access for the group account to one or more particular external users or non-users. If restricting access to particular users, external users or non-users without account access permissions may not access the group account data.

In some embodiments, access permissions for a group account apply to all incidents managed by the group account. That is, access permission may be set at an account level and applied to incidents under the group account. In other embodiments, each incident may be associated with respective access permissions or the account-level access permissions may be modified for particular incidents. For example, a group account may have access permissions that allow access by external users, but access permissions for a particular incident managed by the group account may be modified to only allow access by internal users.

Figure 2:
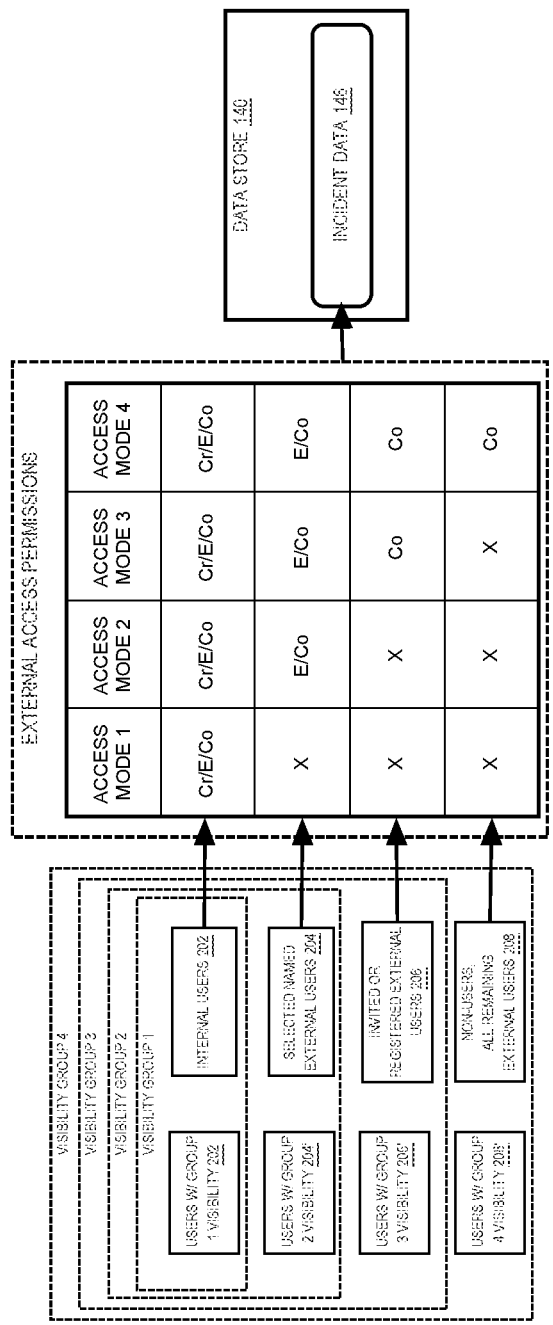
FIG. 2 illustrates an example of grouping user types in visibility groups that may have different respective access permissions, according to an embodiment.

One way to visualize the access permissions for the different user types of internal, named external, invited or registered external, and non-users, is by the visibility group diagram illustrated in FIG. 2. In some instances, the term "guest users" may be used to refer to invited or registered external users and non-users. In other instances, the term "external users" may be used to refer to any users who are not internal users.

As shown in FIG. 2, visibility group 1 may be limited to only internal users 202 of the incident management application 112. In certain embodiments, users in visibility group 1 may have greater access permissions than users in other visibility groups.

Visibility group 2 may include internal users 202 but may also include selected named external users 204. A named external user refers to an external user whose is specified as having access to incident data for the group account, for example, in configuration or access permission data associated with the group account. Access permissions set for users in visibility group 2 apply to internal users and specified named external users, for accessing incident data for the group account.

The named external users may be specified, for example, based on an email address or other identifying information associated with a user. In response to receiving user input specifying one or more users, the server computer may create and store data indicating the named users for the group account. External users or non-users that are not one of the named users cannot access incident data for the group account when access permissions are set to only allow users in visibility group 2 to access incident data for the group account.

If the access permission is set to allow users from visibility group 3 to access incident data, then in addition to internal users 202, and selected named external users 204, invited or registered external users 206 may be allowed to access incident data. Invited or registered external users 206 may be individual user accounts that are not associated with the group account, but that are allowed to access incident data for the group account. Unlike named external users 204, the invited or registered external user 206 accounts may not need to be specified in group account data 142 in advance. However, users that do not have an individual user account, such as non-users 208, may not be allowed to access incident data for the group account, when access permissions are set to only allow users in visibility group 3 to access incident data for the group account.

If the access permission is set to allow users from visibility group 4 to access incident data, then in addition to internal users 202, named external users 204, and invited or registered external users 206, non-users may be allowed to access incident data. Non-users may be individual user accounts that are not associated with the group account and users who are not associated with an individual user account, who are allowed to access incident data for the group account when access permissions are set to allow users in visibility group 4 to access incident data for the group account.

Example external access settings relating to permissions are shown in FIG. 2. Access mode 1 may refer to an access mode in which only internal users, or users in the same visibility group as internal users, can access the incident data. As an example, access mode 1 may be a mode in which only internal users or users in their visibility group can access the incident data using login credentials.

In access mode 1, an internal user may be able to create ("Cr"), edit ("E"), or comment on ("Co") incident data. These access privileges may be extended to internal users in all other access modes. In access mode 2, selected named external users may be allowed to access incident data as well, and be able to edit or comment on incident data. These access privileges may be extended to named external users in access modes 3 and 4. In access mode 3, selected invited or registered external users may be allowed to access incident data as well and be able to comment on incident data. These access privileges may be extended to invited or registered external users in access mode 4. In access mode 4, non-users may be allowed to access incident data as well, and be able to comment on incident data.

In an embodiment, based on the access permissions for a group account, named external users 204, invited or registered external users 206, or non-users 208 may be granted access to incident data for a particular incident of a plurality of incidents managed by the group account. Named external users 204 are granted access to incident data when access permissions for the incident data is set to allow users from visibility group 2 to access the data. Invited or registered external users 206 are granted access to incident data when access permissions for the incident data is set to allow users from visibility group 3 to access the data. Non-users, or all remaining external users, are granted access to incident data when access permissions for the incident data is set to allow users from visibility group 4 to access the data.

Additionally, even if access permissions for the group account indicate that external users or non-users are allowed to access incident data, each external user or non-user may have to be specifically granted access to an incident in order to access incident data for that incident.

In an embodiment, the server computer may receive a request to add a particular external user or non-user to an incident. The request may be received, for example, from an internal user or account administrator for a group account. In response to the request, the server computer determines, based on the access permissions for the group account, whether the particular external user or non-user can be added. For example, if the access permission is set to named external users and invited external users, such as when visibility group 3 is given access permissions to the account incidents, then a non-user cannot be added to the account to view incidents. As another example, if the access permission is set to named external users, then the server computer may determine whether the particular external user is a named external user.

In general, "external users" can refer to selected named external users 204, or guest users, such as invited or registered external users 206 or non-users 208. Selected named external users 204 may be users who are pre-specified by an account administrator for the supply-chain account a given incident is associated with. All selected named external users 204 must be registered, by creating or being assigned login credentials. When permitted under the selected access mode, an internal user can add users of any type as a follower to an incident. Users 206 and 208 may also be referred to as non-named External Users. Guest users may be either invited or registered users 206 with login credentials, or non-registered users 208, who do not have login credentials.

An account administrator can set up whether to allow external user access, by allowing internal users to add external users as followers to incidents. The account administrator can allow one of the following levels of external access settings for the entire group, by the following access modes: access mode 1—a private access mode in which only internal users 202 of visibility group 1 can access account data or other incident data, access mode 2—a named external users mode, in which only internal users 202 and selected named external users 204 of visibility group 2 can access account data or other incident data, access mode 3—a login required mode, in which only internal users 202, selected named external users 204, and invited or registered external users 206 of visibility group 3 can access account data or other incident data, and access mode 4—a no login required mode in which internal users 202, selected named external users 204, invited or registered external users 206, and non-users 208 can access account data or other incident data.

If the particular external user or non-user can be added, in accordance with an administrator authorization or pre-existing access permissions, then the particular external user or non-user is added to the incident and granted access to incident data for the particular incident. Additionally, the server computer may generate and store data indicating that the particular external user or non-user has been granted access to incident data for the particular incident.

4. REPORTS AND CONTROLS FOR INTERNAL, EXTERNAL, AND NON-USERS

Users 202-208 can see incidents in an account based on whether they are an internal or external user. Internal users 202 may have visibility to all incidents in an account. External users such as named external users 204, invited or registered external users 206, and non-users 208 have visibility to only incidents that they are "following" an incident. An external user such as one of users 204-208 in a visibility group can also see all incidents that other users in their visibility group are following.

Figure 3:
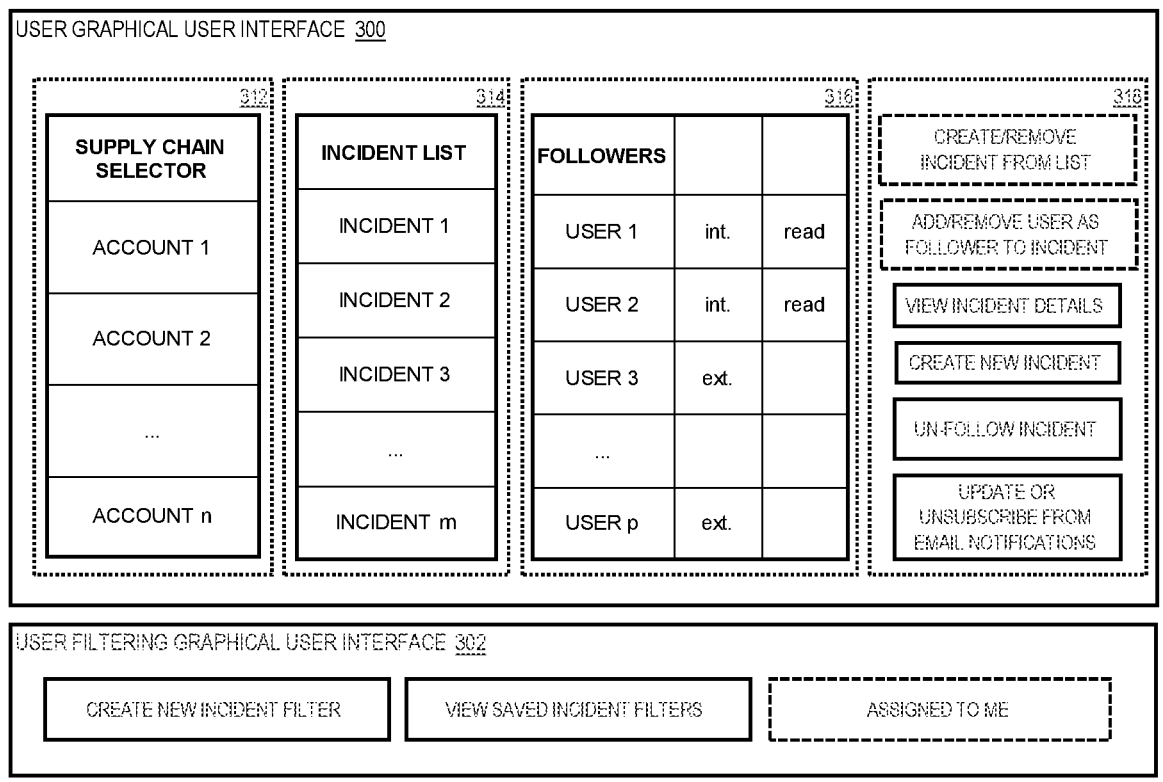
FIG. 3 illustrates example graphical user interfaces that an account administrator of an incident management application may be presented, according to an embodiment.

FIG. 3 illustrates a user graphical user interface (GUI) 300 with menus leading to some of the reports and controls available to a user of an incident management application 112, in accordance with an embodiment. Field 312 may be a supply chain selector, or account selector, by which a user can select one of the N accounts that he/she is assigned to, or is following incidents in.

In one embodiment, only internal users 202 can be incident assignees and external users, such as users 204-208 cannot be assignees, only followers. In an embodiment, any internal user 202 can assign incidents, and only external users of users 204-208 who have create and/or edit permissions to incidents can assign incidents. Other embodiments may use different policy and processing logic for the foregoing aspects of access.

An internal user 202 can add other internal users and external users such as users 204-208 as followers to an incident. In an embodiment, external users may add internal users as followers to an incident, but may not add external users. When being added as followers, guest users such as invited users 206 and 208 are specified solely via an email address, whereas internal users 202 and named external users 204 may be specified by either name or email address. When external users 204-208 are added as followers, the user adding the follower will be presented with a confirmation dialog stating that it is a person outside their company and that person will have access to all the current details and future edits to the incident.

List 314 may be an incident list, by which a user can select one of the m incidents associated with the given account selected in selector 312. Followers are displayed on a list in field 316 for each incident. FIG. 3 lists USER 1, USER 2, . . . , USER p, followed by an indication of whether the user is an internal user "int." or an external user "ext." Also, a list of followers of field 316 may display a user name, rather than a user number, on the incident in the following format: for internal users 202—a full name, for a named external user 204—a full name, for a guest user such as an invited or registered guest user 206 or a non-user 208—an email address. For security reasons, users shouldn't be able to "discover" whether an email address is correlated with a registered external user 206; any auto-suggest functionality for followers should include email address for all users and name for internal users 202, and named external users 204.

Field 318 provides controls to a user. Options in field 318 marked with solid line boundaries may represent controls that are available to all users. For incidents that a user has privileges to view, a user may be able to view incident details, un-follow or unsubscribe from an incident and its associated notifications, or update email notification preferences—including unsubscribing from all email notifications. Some options of user GUI 300, particularly in field 318, may be available only to internal users.

As an example, the option to create/remove access of a particular user to an incident in the list of incidents in field 314 may be limited to users with creation and editing privileges. Similarly, the ability to add or remove users as followers to an incident may be limited to internal users 202.

Auto-suggest features in the option to add or remove users as followers to an incident should show recently used users specific to each individual registered user based on followers they have invited in the past. A registered user may have a personal address book where they can (1) delete auto-suggestions so they don't get suggested in the future and (2) add first and last name to guest users that can be used for selection and auto-suggestion. In this case (2), the first and last name may be displayed in the auto-suggest and follower lists. However, it should still be very clear when inviting or viewing followers that specific users are outside their company. One way to indicate this is shown in FIG. 3, by the "int." and "ext." indicators for internal and external users, respectively.

For users who can create/edit incidents, certain values and custom fields will be based on the Account where the incident is/was created and the users. As an example, incident attribute values, which are configurable values like Incident Types, Groups, Root Cause, Value at Risk, may differ based on the Account for which the incident is being created/edited. Similarly, master data, which are impacted supply-chain elements like sites and products that are affected by incidents, or organization data like user lists when adding assignees or followers, will be based on the Account where the incident is/was created. definiIn an embodiment, only users who have the role "Incident Creator" or "Incident Editor" will have full visibility to the list of available choices for all attributes. One of the fields in the View Incident Details menu, where external users 204 will not have the same available choices as internal users 202, is a field relating to impacted shipment elements where internal users 202 may be provided a typeahead search to see available shipments, but external users will not have visibility into the available shipments list, and no typeahead search.

User filtering graphical user interface (GUI) 502 may allow a user to create a new incident filter. These filters will only apply to the account or supply chain that the user is currently viewing, due to some of the configurable values only applying to a single supply chain, as mentioned above. When creating a new filter, a user may be able to save the filter. GUI 502 may also allow a user to view saved incident filters and apply a filter to update the display to show incidents based on the filter. An option in GUI 502 to filter incidents or accounts by those that are "assigned to me" may be an option that is only available to internal users 202.

5. REPORTS AND CONTROLS FOR ADMINISTRATORS

Figure 4:
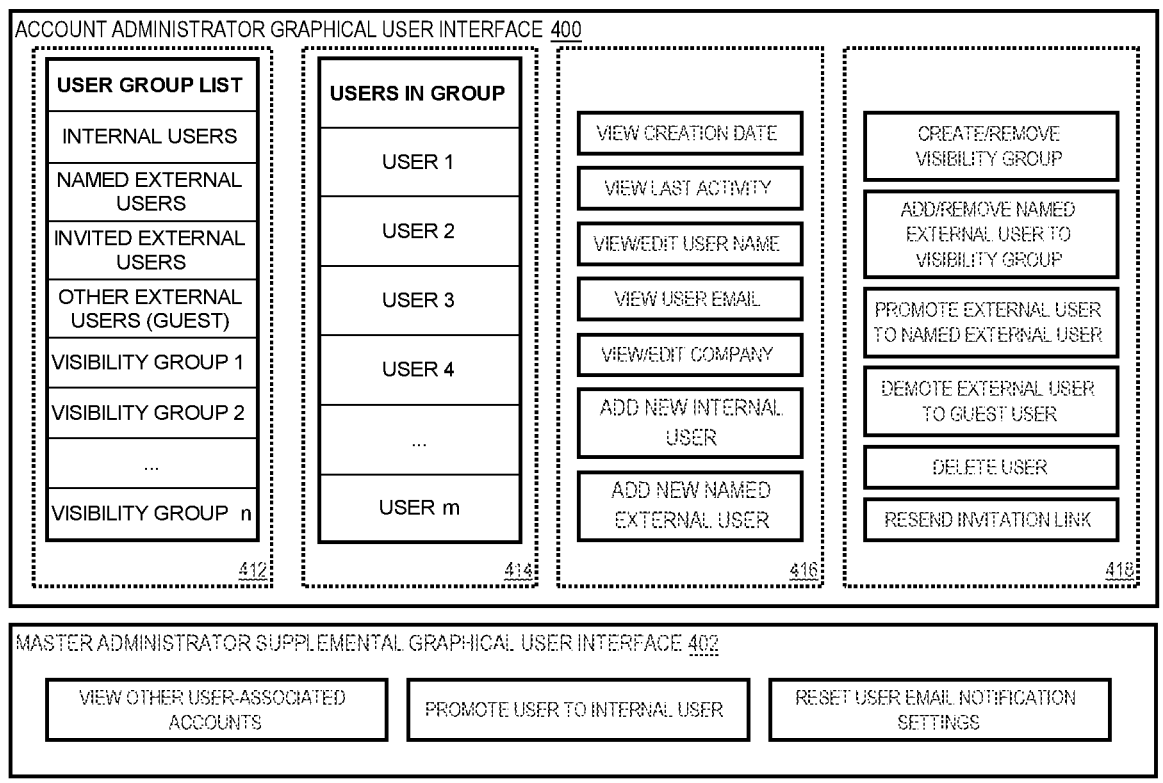
FIG. 4 illustrates example graphical user interfaces that a user of an incident management application may be presented, according to an embodiment.

FIG. 4 illustrates an account administrator graphical user interface (GUI) 400 with menus leading to some of the reports and controls available to an account administrator of an incident management application 112, in accordance with an embodiment. Field 412 may be a user group list, by which an account administrator can select one of the n groups that has access to the account. Field 414 may be a list of individual users that belong to the user group selected from the list in field 412. Selecting one of the user groups, such as "internal users" from field 412 may cause a list of internal users 202 to be shown in the field 414.

Fields 416 and 418 illustrate various reports and control functions that may be available to an account administrator. In field 416, an administrator may be provided the option to view creation date, which is the date the user was added to the Account; view last activity date of a particular user in that account, view/edit a selected user's name that is visible to other users in that account, view the email address of the selected user, view/edit company name of the selected user, add a new internal user 202, and add a new named external user 204.

In field 418, an administrator may be provided the option to create/remove a visibility group, allowing the administrator to add a visibility group or remove a visibility group from one of the n displayed visibility groups. When adding a visibility group, an administrator may be prompted to provide access control settings for members of the new visibility group. An administrator may also be given the option to add or remove a named external user 204 to a selected visibility group in the user group list of field 412. When an administrator selects a user who is either an invited/registered guest user 206 or a non-user 208 in field 414, field 418 may provide the administrator an option to promote the user to a named internal user 202 or a named external user 204. Similarly, if a user selected in field 414 is a named external user 204, an administrator may have the option to demote the named external user 204 to a guest user—or in other words, the named external user 204 may be demoted to a registered guest user 206 or a non-user 208.

When selecting an internal user 202 or a named external user 204 in field 414, an administrator may be provided the option to inactivate an internal user 202 or named external user 204 in field 418. Engaging this option removes the selected user's access to the account. When the user selected is a named external user 204, the system may provide the account administrator with a confirmation message asking whether a demotion of the named external user to a guest user is desired, instead of inactivation. Additionally, when selecting a non-user 208 in field 414, to whom an invitation link has been sent, a resend invitation link option may be provided to an account administrator so that the invitation link can be resent.

Some account administrators provided with the GUI 400 may be master administrators and may be provided a master administrator supplemental GUI 402. Supplemental GUI 402 may provide the master administrator the option to, when selecting a user in field 414, view all accounts the user is associated with, if there are any. GUI 400 relates to user groups and users in a particular account. Master administrators may be able to use the option in supplemental GUI 402 to view other accounts that a particular selected user is associated with and open the respective GUI 400 associated with any of the other accounts.

Granting Access to External and Non-Users

Figure 5:
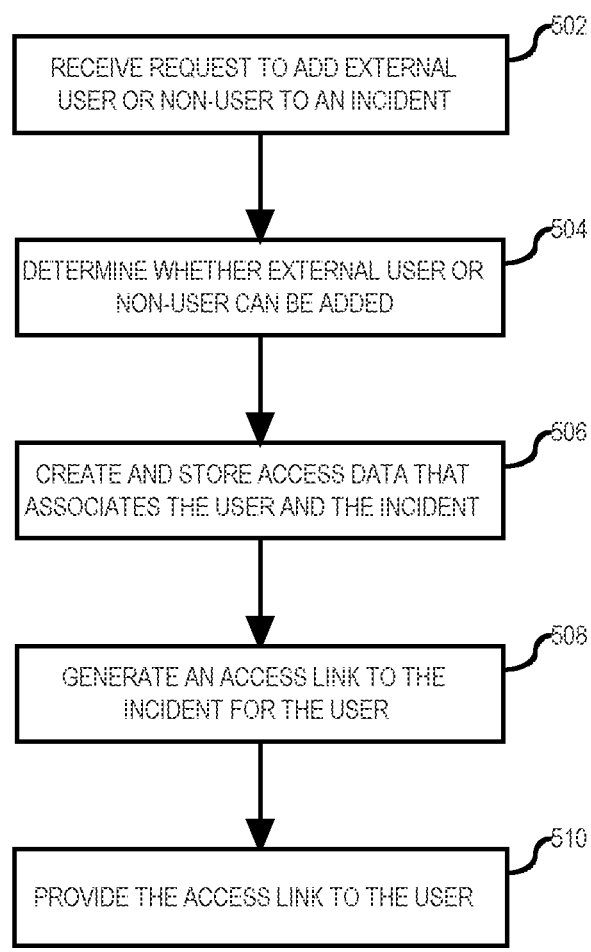
FIG. 5 illustrates an example process for validating a request to associate a user with an account incident, according to an embodiment.

FIG. 5 illustrates example steps for granting access to incident data to a particular external user or non-user. A non-user, such as one of non-users 208, may be an individual without an active user account associated with the incident management application instance 112. Since the non-user does not have an association with any group account data, or an individual user account associated with the incident management application instance 112, there may be no identifying information of the non-user in the group account data 142 or individual user account data 144. However, it may be valuable to receive comments or other submissions from non-users, relating to incident data 146 that is visible to internal users 202 and named external users 204. As described in connection with FIG. 3, a commenting privilege extended to non-users 208 may allow the non-users an ability to comment on incidents. To grant additional access privileges to non-users 208 so they can become invited or registered external users 206, or even promoted to a named external user 204 or internal user 202, the method of FIG. 5 may be performed. Non-users 208 can become invited or registered external users 206, or a named external user 204, or internal user 202, and thereby gain the access privileges of the visibility groups associated with those user classes.

Although the steps in FIG. 5 are shown in one example order, the steps of FIG. 5 may be performed in any order and are not limited to the order shown in FIG. 5. Additionally, some steps may be optional, may be performed multiple times, and/or may be performed by different components. All steps, operations, and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

At step 502, a request to add an external user or a non-user as a follower to an incident is received. For example, server computer 110 may receive a request from a client computer 120 associated with an internal user, the request specifying that a user associated with the email "john.smith@othercompany.com" be added as a follower to a particular incident of a group account.

At step 504, whether the external user or non-user specified in the request can be added is determined. In an embodiment, determining whether the external user or non-user may be added comprises determining the access permissions associated with the group account and determining whether the request specifies an external user or a non-user. Based on the access permissions and the type of user that is specified in the request, determining whether the user may be added may further comprise determining whether external users are able to be added to incidents for the group account, whether non-users are able to be added to incidents for the group account, or whether the specified user is a named user.

Referring to the above example, server computer 110 may determine what access permissions are associated with the group account. As an example, if the access permissions indicate that access is limited to named external users 204, server computer 110 may determine whether "john.smith@othercompany.com" is one of the named external users 204 of the group account, by consulting the group account data 142.

At step 506, in response to determining that the external user or non-user can be added, a corresponding data record is created and stored in association with the specified user and the particular incident. The data record may indicate that the specified user has access to the particular incident.

At step 508, an access link may be generated in association with the specified user and the particular incident. The access link may be used to request access to the particular incident. Additionally, when used to request access to the particular incident, the request may be associated with the specified user. In an embodiment, the access link is a unique web link that is generated for the specified user and the particular incident. The data record generated in step 508 above may associate the unique weblink with the specified user and the particular incident. As discussed in further detail below, when a user uses the access link to view the particular incident, the server computer determines which user is making the request and the particular incident that the user is requesting access for based on the access link used to make the request.

At step 510, the access link is provided to the specified user. Referring to the above example, server computer 110 may cause the access link to be emailed to "john.smith@othercompany.com." Any number of techniques for providing an access link to a user may be used, depending on the implementation.

6. VALIDATING ACCESS REQUESTS

Figure 6:
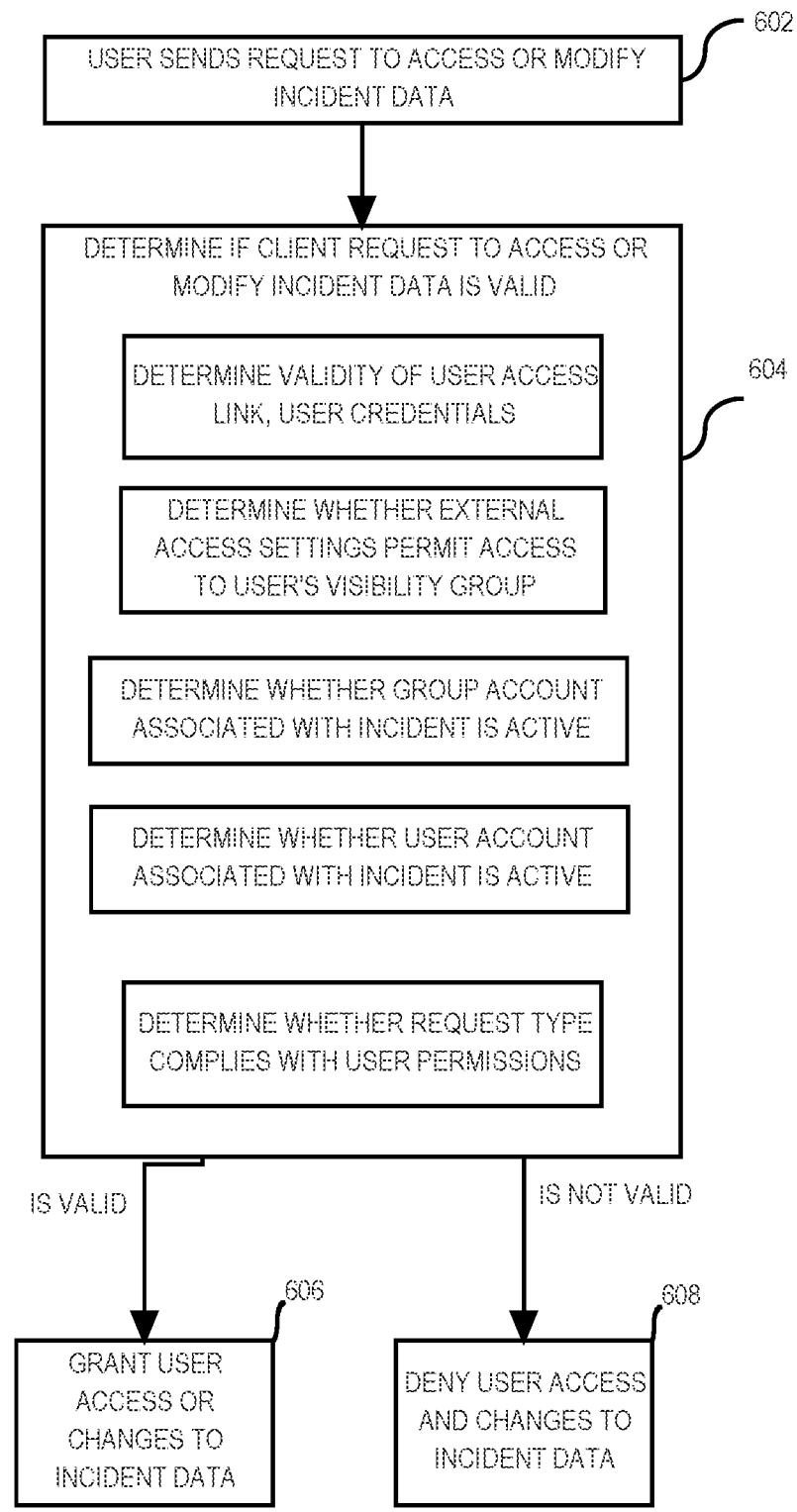
FIG. 6 illustrates an example process for validating a user request to perform an access or modification action on account incident data, according to an embodiment.

FIG. 6 illustrates example steps for providing access to incident data to a particular external user or non-user. In general, external users may include named external users 204 and invited or registered external users 206. Non-users may include non-users and all remaining external users 208. External users and non-users may belong to different visibility groups and may additionally have different access settings or permissions.

Although the steps in FIG. 6 are shown in an order, the steps of FIG. 6 may be performed in any order and are not limited to the order shown in FIG. 6. Additionally, some steps may be optional, may be performed multiple times, and/or may be performed by different components. All steps, operations, and functions of a flow diagram that are described herein are intended to indicate operations that are performed using programming in a special-purpose computer or general-purpose computer, in various embodiments, at the same level of detail that is used by persons of ordinary skill in the art to which the disclosure pertains for communicating with one another about similar computer programs or algorithms. In other words, each flow diagram in this disclosure is a guide, plan or specification of an algorithm for programming a computer to execute the functions that are described.

At step 602, a user request to view a particular incident is received. For example, server computer 110 may receive a request 130 from user computing device 120. In an embodiment, the user access request 130 is received from a browser, such as browser 122, via an access link for particular incident information previously sent to the external user or non-user. In other embodiments, the request may be received from an application or other software executing on client computer device 120.

At step 604, the server computer validates the request to view the particular incident. At step 604, various determinations may be made, with the end of determining if the user request 130 to access or modify particular incident data is valid. In an embodiment, as shown in FIG. 6, step 604, the determinations may include: determine validity of user access link, user credentials; determine whether external access settings permit access to user's visibility group; determine whether group account associated with incident is active; determine whether user account associated with incident is active; determine whether request type complies with user permissions.

In an embodiment, the request is received via an access link. Validating the request comprises determining, at the time the request is received, whether the access link is a valid link. Determining whether the access link is valid may be based on data records associated with the access link. In an embodiment, if the access link is associated with a particular external user, the particular external user may be required to log in to the system in order for the request to be validated.

If it is determined that the user access link or user credentials are not valid, the method of FIG. 6 may proceed to step 608, where the user access and changes to the particular incident data are denied.

In an embodiment, validating the request comprises determining whether the external user or non-user associated with the request 130 is a member of a visibility group that has access permissions that grant access to the particular incident targeted by the request 130. Based on determining the visibility group that the user associated with the request 130 belongs to, and determining whether the incident access request 130 relates to an access or modification of the particular incident permitted to users in that determined visibility group, a determination of the validity of user request 130 is made.

In an embodiment, an internal user 202 of an account may have visibility to all incidents in the account. An external user of any of the user groups 204-208 may only have visibility to incidents that they are following, or added as followers to, in an account. An external user may be added as a follower to an incident by an internal user 202 by choosing an appropriate option in field 318 of the user GUI 300, where an option to "add/remove user as follower to incident" is provided. In an embodiment, an external user belonging to a given visibility group may also be able to see all incidents that other users in their visibility group can see.

If it is determined that access or modification privileges to the particular incident data specified in user request 130 is not granted to the user's visibility group by the access permissions, the method of FIG. 6 may proceed to step 608, where the user access and changes to the particular incident data are denied.

In an embodiment, group accounts associated with supply-chain incident management application instance 112, may be either active or inactive. An active group account may be an account with a currently valid, paid subscription to the incident management application instance 112. An inactive account may be an account that is currently invalid, for an example, a group account with an expired subscription to the incident management application instance 112.

When a group account is inactivated, such as when a subscription expires to the application instance 112 expires, internal users 202 as well as external users 204-208 will be unable to access the inactive group account, including the incidents in the inactive group account. However, users including internal users in the inactive group account may still be able to access incidents in other group accounts as normal. In other words, users of one inactive group account can login to incident management application instance 112 and access third-party incidents in other group accounts, to which they are added as followers.

If it is determined that the group account associated with the particular incident is inactive, the method of FIG. 6 may proceed to step 608, where the user access and changes to the particular incident data are denied.

In an embodiment, for each combination of user and account, the user has one of three permissions for managing incident data, with respect to incidents in the account that they have visibility to: (1) create/edit/comment permissions—a user with these permissions can create incidents, edit existing incidents, and comment/add attachments/add links; these permissions are an option for all internal users 202 and all named external users 204 as specified by an account administrator for the account. An account administrator may promote an external user such as one of the users in user classes 206 and 208, to the named external user class 204 by selecting an appropriate menu option in field 418 of account administrator GUI 400. (2) Edit/comment privileges—a user with these privileges can edit existing incidents, and comment/add attachments/add links; these permissions are an option for all internal users 202 and all named external users 204 as specified by the account administrator for the account. (3) Comment privileges—a user with these privileges user can only comment/add attachments/add links; these permissions are an option for all internal users 202 and all named external users 204 as specified by the account administrator for the account. In addition, this permission (3) is available to guest users such as registered guest users 206 and non-users 208.

If the user request 130 received at step 602 contains a request for an action type that does not comply with the user-held privileges, such as by requesting a create or edit action when the user only has comment privileges, the method of FIG. 6 may proceed to step 608, where the user access and changes to the particular incident data are denied.

In an embodiment, an account administrator can set up whether to allow external user access, by allowing internal users to add external users as followers to incidents. The account administrator can allow one of the following levels of external access for the entire group account, by the following access modes: (1) a private access mode in which only internal users 202 of visibility group 1 can access account data or other incident data, (2) a named external users mode, in which only internal users 202 and selected named external users 204 of visibility group 2 can access account data or other incident data, (3) a login required mode, in which only internal users 202, selected named external users 204, and invited or registered external users 206 of visibility group 3 can access account data or other incident data, and (4) a no login required mode in which internal users 202, selected named external users 204, invited or registered external users 206, and non-users 208 can access account data or other incident data.

If the user request 130 received at step 602 is received by a mode that does not allow access to users of that visibility group, such as by an external user trying to access incident data when the account is in a private access mode, the method of FIG. 6 may proceed to step 608, where the user access and changes to the particular incident data are denied.

If the method of FIG. 6 was not directed to step 608 by a prohibitive or negative determination in the various sub steps of step 604, the method of FIG. 6 may proceed to step 606. At step 606, the request is validated, and the server computer may provide the user computing device access to the particular incident. Providing access to the particular incident may include sending incident data to the user computing device, causing generation of a graphical user interface or web page corresponding to the particular incident, or otherwise providing incident data associated with the particular incident to the requesting external user or non-user. In this context, access may include the ability to create incidents, edit existing incidents, and comment/add attachments/add links. Additionally, providing access to the particular incident may include generating a user access link 134 for the external user or non-user to generate or modify incident data for the particular incident, for example using the graphical user interface or web page. The generated user access link 134 may be sent to the user computing devices 120 over the network 125.

7. EXTERNAL ACCESS METHODS

As noted above, four external access methods can be applied to a group account that user attempts to access or modify. In a private access mode (1), which may be a default mode of a group account on the incident management application instance 112, internal users 202 cannot add external users as followers to an incident. If external users in user classes 204-208 were previously added to incidents, prior to the mode being changed to the private access mode, those external users may still be displayed on the incident as followers, but those users may no longer have access to incidents via link or login on user computing device 120. When previously added guest users such as users in classes 206-208 try to access via the link, they receive notification that access is denied 608. When trying to access the account via login, as a named external user 204 or a registered external user 206, the account may not be displayed in the supply chain selector, such as field 312 of user GUI 300. If the account switched to private access mode was the previously selected supply chain, an external user may be forced to select a new supply chain. No notifications for incidents in this account will be sent to external users.

In a named external users only mode (2), only named external users 204 in addition to internal users 202 may be allowed to access incidents. Named external users 204 may only be allowed access to incidents which they are followers of Users 202 and 204 must be logged in to see an incident in this mode. Only internal users and named external users can be added as followers to incidents. In an embodiment, only internal users 202 may add external users as followers to incidents.

In an embodiment, registration instructions may be executed to register users in the system and its data repositories; in this context, registration comprises creating a user account and in some instances performing an email address verification step. In a login required mode (3) only external users that are registered, such as named external users 204 and registered guest users 206 can access incidents of which they are followers. Any non-registered guest user or non-user 208 added as a follower to an incident must register to view an incident. In other words, non-registered guest users or non-users 208 can be added as followers, but they need to register to become registered guest users 206 before they can view an incident when an account is in the login required mode. All external users 204-208 who are followers may need to login to view the incident and may view incidents by selecting the "view incident details" option in field 318. Additionally, one of the fields 316 or 318 may be replaced with a visualization or incident workspace containing the incident details when an incident is selected for viewing from the incident list of field 314. In an embodiment, for external users, only those that are followers to an incident can access the incident. If an external user forwarded an email link to other third-parties, those third-parties may not be provided with access to the incident since login is required to access the incident, in the login required mode.

In a no login required mode (4), any external user from user classes 204-208 can access an incident when added as a follower by receiving an access link in an email notification. The external user that can access incident data in the no login required mode can be a non-user 208, named external user 204, or an invited or registered external user 206. If the follower forwards the email notification or link to other third-parties, those other third-parties will have external access to the incident but won't be followers of the incident. When an external user is removed as a follower from an incident, the link to that incident will no longer work, for that external user or anyone they may have forwarded the link to. If an external user is a named external user 204 or an invited or registered external user 206, they are not required to be logged in to access an incident they are following if the account is in the no login required mode.

In the no login required mode, a non-logged in user accessing the incident via the email notification link, assuming they have the appropriate access, will be able to only view the incident. If the user is logged in, clicking on the email notification link will bring the user to the incident detail page described above in connection with user GUI 300. If the user is logged into a different supply chain, the user will receive a message stating that the supply chain is changing. When a user is not logged in and is viewing an incident, he/she will not have access to any other navigation to supplementary menus such as tabs and settings. Any user who can view an incident can see all fields, field values, and comments for the incident.

8. REMOVING ACCESS FROM EXTERNAL AND NON-USERS; CHANGING NOTIFICATION PREFERENCES

In an embodiment, a user who is a follower of a particular incident can unfollow the particular incident, which removes access to the incident, unless the user is an internal user.

In an embodiment, an external user can unfollow an incident via a link in the email received with a notification of the incident. When clicking on the unfollow link, the user browser may display a web page allowing the user to choose one of a set of unfollowing options. They will receive an email confirmation of their option and will not receive any future email notifications for the incident or incidents selected in the unfollow option.

Further, in an embodiment, each user may update email notification preferences that apply to all incidents that the user is following. For example, any follower can unsubscribe to all email notifications. Registered users such as users 202, 204, 206 can modify their email notifications preferences in a user settings menu accessible from the user GUI 300. An update to email notification preferences may apply to both incidents for which they are following as internal users 202 and incidents they are following as external users in a user class 204 or 206. Non-users 208 may have the option to "unsubscribe from notifications for this incident," or "unsubscribe from all email notifications." Registered users, such as users 202, 204, 206, may have the option to "unfollow from this incident" or "update email notification preferences." Registered users who select the latter may be provided more granular control of email notifications.

9. IMPLEMENTATION EXAMPLE—HARDWARE OVERVIEW

According to one embodiment, the techniques described herein are implemented by at least one computing device. The techniques may be implemented in whole or in part using a combination of at least one server computer and/or other computing devices that are coupled using a network, such as a packet data network. The computing devices may be hard-wired to perform the techniques or may include digital electronic devices such as at least one application-specific integrated circuit (ASIC) or field-programmable gate array (FPGA) that is persistently programmed to perform the techniques, or may include at least one general-purpose hardware processor programmed to perform the techniques pursuant to program instructions in firmware, memory, other storage, or a combination. Such computing devices may also combine custom hard-wired logic, ASICs, or FPGAs with custom programming to accomplish the described techniques. The computing devices may be server computers, workstations, personal computers, portable computer systems, handheld devices, mobile computing devices, wearable devices, body-mounted or implantable devices, smartphones, smart appliances, internetworking devices, autonomous or semi-autonomous devices such as robots or unmanned ground or aerial vehicles, any other electronic device that incorporates hard-wired and/or program logic to implement the described techniques, one or more virtual computing machines or instances in a data center, and/or a network of server computers and/or personal computers.

Figure 7:
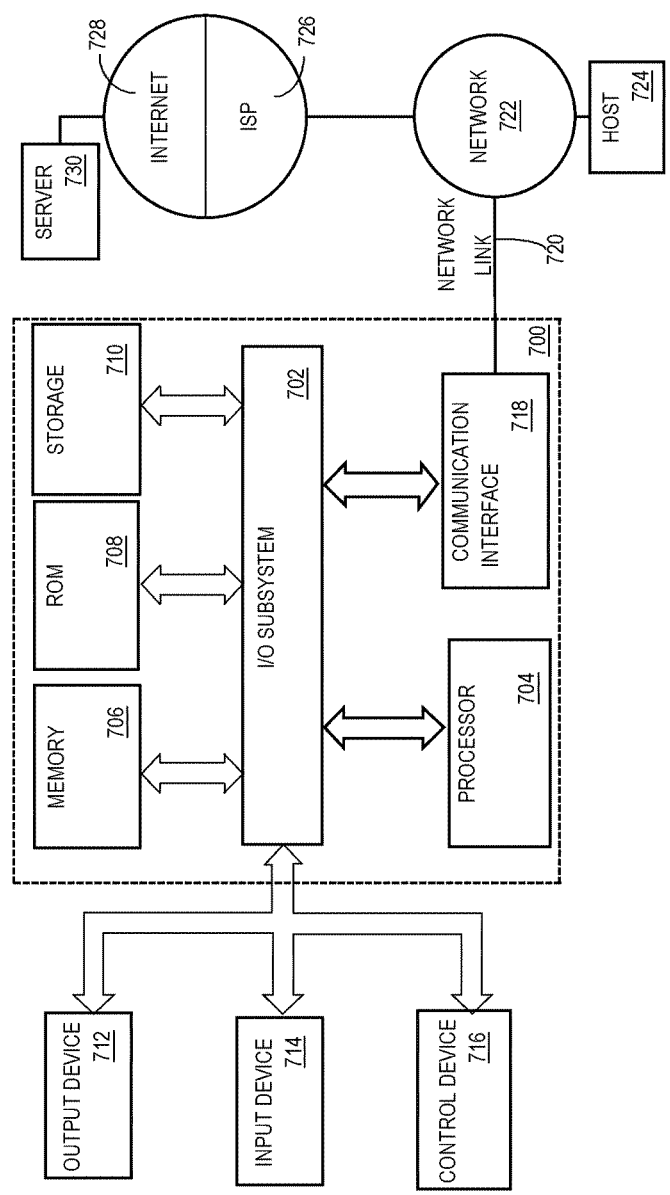
FIG. 7 illustrates a computer system upon which various embodiments may be implemented.

FIG. 7 is a block diagram that illustrates an example computer system with which an embodiment may be implemented. In the example of FIG. 7, a computer system 700 and instructions for implementing the disclosed technologies in hardware, software, or a combination of hardware and software, are represented schematically, for example as boxes and circles, at the same level of detail that is commonly used by persons of ordinary skill in the art to which this disclosure pertains for communicating about computer architecture and computer systems implementations.

Computer system 700 includes an input/output (I/O) subsystem 702 which may include a bus and/or other communication mechanism(s) for communicating information and/or instructions between the components of the computer system 700 over electronic signal paths. The I/O subsystem 702 may include an I/O controller, a memory controller and at least one I/O port. The electronic signal paths are represented schematically in the drawings, for example as lines, unidirectional arrows, or bidirectional arrows.

At least one hardware processor 704 is coupled to I/O subsystem 702 for processing information and instructions. Hardware processor 704 may include, for example, a general-purpose microprocessor or microcontroller and/or a special-purpose microprocessor such as an embedded system or a graphics processing unit (GPU) or a digital signal processor or ARM processor. Processor 704 may comprise an integrated arithmetic logic unit (ALU) or may be coupled to a separate ALU.

Computer system 700 includes one or more units of memory 706, such as a main memory, which is coupled to I/O subsystem 702 for electronically digitally storing data and instructions to be executed by processor 704. Memory 706 may include volatile memory such as various forms of random-access memory (RAM) or other dynamic storage devices. Memory 706 also may be used for storing temporary variables or other intermediate information during execution of instructions to be executed by processor 704. Such instructions, when stored in non-transitory computer-readable storage media accessible to processor 704, can render computer system 700 into a special-purpose machine that is customized to perform the operations specified in the instructions.

Computer system 700 further includes non-volatile memory such as read-only memory (ROM) 708 or other static storage device coupled to I/O subsystem 702 for storing information and instructions for processor 704. The ROM 708 may include various forms of programmable ROM (PROM) such as erasable PROM (EPROM) or electrically erasable PROM (EEPROM). A unit of persistent storage 710 may include various forms of non-volatile RAM (NVRAM), such as FLASH memory, or solid-state storage, magnetic disk, or optical disks such as CD-ROM or DVD-ROM, and may be coupled to I/O subsystem 702 for storing information and instructions. Storage 710 is an example of a non-transitory computer-readable medium that may be used to store instructions and data which when executed by the processor 704 cause performing computer-implemented methods to execute the techniques herein.

The instructions in memory 706, ROM 708, or storage 710 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. The instructions may implement a web server, web application server, or web client. The instructions may be organized as a presentation layer, application layer, and data storage layer such as a relational database system using a structured query language (SQL) or no SQL, an object store, a graph database, a flat-file system or other data storage.

Computer system 700 may be coupled via I/O subsystem 702 to at least one output device 712. In one embodiment, output device 712 is a digital computer display. Examples of a display that may be used in various embodiments include a touch screen display or a light-emitting diode (LED) display or a liquid crystal display (LCD) or an e-paper display. Computer system 700 may include other type(s) of output devices 712, alternatively or in addition to a display device. Examples of other output devices 712 include printers, ticket printers, plotters, projectors, sound cards or video cards, speakers, buzzers or piezoelectric devices, or other audible devices, lamps or LED or LCD indicators, haptic devices, actuators or servos.

At least one input device 714 is coupled to I/O subsystem 702 for communicating signals, data, command selections, or gestures to processor 704. Examples of input devices 714 include touch screens, microphones, still and video digital cameras, alphanumeric and other keys, keypads, keyboards, graphics tablets, image scanners, joysticks, clocks, switches, buttons, dials, slides, and/or various types of sensors such as force sensors, motion sensors, heat sensors, accelerometers, gyroscopes, and inertial measurement unit (IMU) sensors and/or various types of transceivers such as wireless, such as cellular or Wi-Fi, radio frequency (RF) or infrared (IR) transceivers and Global Positioning System (GPS) transceivers.

Another type of input device is a control device 716, which may perform cursor control or other automated control functions such as navigation in a graphical interface on a display screen, alternatively or in addition to input functions. Control device 716 may be a touchpad, a mouse, a trackball, or cursor direction keys for communicating direction information and command selections to processor 704 and for controlling cursor movement on display 712. The input device may have at least two degrees of freedom in two axes, a first axis (e.g., x) and a second axis (e.g., y), that allows the device to specify positions in a plane. Another type of input device is a wired, wireless, or optical control device such as a joystick, wand, console, steering wheel, pedal, gearshift mechanism or other type of control device. An input device 714 may include a combination of multiple different input devices, such as a video camera and a depth sensor.

In another embodiment, computer system 700 may comprise an internet of things (IoT) device in which one or more of the output device 712, input device 714, and control device 716 are omitted. Or, in such an embodiment, the input device 714 may comprise one or more cameras, motion detectors, thermometers, microphones, seismic detectors, other sensors or detectors, measurement devices or encoders and the output device 712 may comprise a special-purpose display such as a single-line LED or LCD display, one or more indicators, a display panel, a meter, a valve, a solenoid, an actuator or a servo.

When computer system 700 is a mobile computing device, input device 714 may comprise a global positioning system (GPS) receiver coupled to a GPS module that is capable of triangulating to a plurality of GPS satellites, determining and generating geo-location or position data such as latitude-longitude values for a geophysical location of the computer system 700. Output device 712 may include hardware, software, firmware and interfaces for generating position reporting packets, notifications, pulse or heartbeat signals, or other recurring data transmissions that specify a position of the computer system 700, alone or in combination with other application-specific data, directed toward host 724 or server 730.

Computer system 700 may implement the techniques described herein using customized hard-wired logic, at least one ASIC or FPGA, firmware, and/or program instructions or logic which when loaded and used or executed in combination with the computer system causes or programs the computer system to operate as a special-purpose machine. According to one embodiment, the techniques herein are performed by computer system 700 in response to processor 704 executing at least one sequence of at least one instruction contained in main memory 706. Such instructions may be read into main memory 706 from another storage medium, such as storage 710. Execution of the sequences of instructions contained in main memory 706 causes processor 704 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage 710. Volatile media includes dynamic memory, such as memory 706. Common forms of storage media include, for example, a hard disk, solid-state drive, flash drive, magnetic data storage medium, any optical or physical data storage medium, memory chip, or the like.

Storage media is distinct from but may be used in conjunction with transmission media. Transmission media participates in transferring information between storage media. For example, transmission media includes coaxial cables, copper wire and fiber optics, including the wires that comprise a bus of I/O subsystem 702. Transmission media can also take the form of acoustic or light waves, such as those generated during radio-wave and infra-red data communications.

Various forms of media may be involved in carrying at least one sequence of at least one instruction to processor 704 for execution. For example, the instructions may initially be carried on a magnetic disk or solid-state drive of a remote computer. The remote computer can load the instructions into its dynamic memory and send the instructions over a communication link such as a fiber optic or coaxial cable or telephone line using a modem. A modem or router local to computer system 700 can receive the data on the communication link and convert the data to a format that can be read by computer system 700. For instance, a receiver such as a radio frequency antenna or an infrared detector can receive the data carried in a wireless or optical signal and appropriate circuitry can provide the data to I/O subsystem 702 such as placing the data on a bus. I/O subsystem 702 carries the data to memory 706, from which processor 704 retrieves and executes the instructions. The instructions received by memory 706 may optionally be stored on storage 710 either before or after execution by processor 704.

Computer system 700 also includes a communication interface 718 coupled to bus 702. Communication interface 718 provides a two-way data communication coupling to network link(s) 720 that are directly or indirectly connected to at least one communication networks, such as a network 722 or a public or private cloud on the Internet. For example, communication interface 718 may be an Ethernet networking interface, integrated-services digital network (ISDN) card, cable modem, satellite modem, or a modem to provide a data communication connection to a corresponding type of communications line, for example, an Ethernet cable or a metal cable of any kind or a fiber-optic line or a telephone line. Network 722 broadly represents a local area network (LAN), wide-area network (WAN), campus network, internetwork, or any combination thereof. Communication interface 718 may comprise a LAN card to provide a data communication connection to a compatible LAN or a cellular radiotelephone interface that is wired to send or receive cellular data according to cellular radiotelephone wireless networking standards, or a satellite radio interface that is wired to send or receive digital data according to satellite wireless networking standards. In any such implementation, communication interface 718 sends and receives electrical, electromagnetic, or optical signals over signal paths that carry digital data streams representing various types of information.

Network link 720 typically provides electrical, electromagnetic, or optical data communication directly or through at least one network to other data devices, using, for example, satellite, cellular, Wi-Fi, or BLUETOOTH technology. For example, network link 720 may provide a connection through a network 722 to a host computer 724.

Furthermore, network link 720 may provide a connection through network 722 or to other computing devices via internetworking devices and/or computers that are operated by an Internet Service Provider (ISP) 726. ISP 726 provides data communication services through a world-wide packet data communication network represented as internet 728. A server computer 730 may be coupled to internet 728. Server 730 broadly represents any computer, data center, virtual machine, or virtual computing instance with or without a hypervisor, or computer executing a containerized program system such as DOCKER or KUBERNETES. Server 730 may represent an electronic digital service that is implemented using more than one computer or instance and that is accessed and used by transmitting web services requests, uniform resource locator (URL) strings with parameters in HTTP payloads, API calls, app services calls, or other service calls. Computer system 700 and server 730 may form elements of a distributed computing system that includes other computers, a processing cluster, server farm or other organization of computers that cooperate to perform tasks or execute applications or services. Server 730 may comprise one or more sets of instructions that are organized as modules, methods, objects, functions, routines, or calls. The instructions may be organized as one or more computer programs, operating system services, or application programs including mobile apps. The instructions may comprise an operating system and/or system software; one or more libraries to support multimedia, programming or other functions; data protocol instructions or stacks to implement TCP/IP, HTTP or other communication protocols; file format processing instructions to parse or render files coded using HTML, XML, JPEG, MPEG or PNG; user interface instructions to render or interpret commands for a graphical user interface (GUI), command-line interface or text user interface; application software such as an office suite, internet access applications, design and manufacturing applications, graphics applications, audio applications, software engineering applications, educational applications, games or miscellaneous applications. Server 730 may comprise a web application server that hosts a presentation layer, application layer, and data storage layer such as a relational database system using a structured query language (SQL) or no SQL, an object store, a graph database, a flat-file system or other data storage.

Computer system 700 can send messages and receive data and instructions, including program code, through the network(s), network link 720, and communication interface 718. In the Internet example, a server 730 might transmit a requested code for an application program through Internet 728, ISP 726, local network 722, and communication interface 718. The received code may be executed by processor 704 as it is received, and/or stored in storage 710, or other non-volatile storage for later execution.

The execution of instructions as described in this section may implement a process in the form of an instance of a computer program that is being executed and consisting of program code and its current activity. Depending on the operating system (OS), a process may be made up of multiple threads of execution that execute instructions concurrently. In this context, a computer program is a passive collection of instructions, while a process may be the actual execution of those instructions. Several processes may be associated with the same program; for example, opening up several instances of the same program often means more than one process is being executed. Multitasking may be implemented to allow multiple processes to share processor 704. While each processor 704 or core of the processor executes a single task at a time, computer system 700 may be programmed to implement multitasking to allow each processor to switch between tasks that are being executed without having to wait for each task to finish. In an embodiment, switches may be performed when tasks perform input/output operations when a task indicates that it can be switched, or on hardware interrupts. Time-sharing may be implemented to allow fast response for interactive user applications by rapidly performing context switches to provide the appearance of concurrent execution of multiple processes simultaneously. In an embodiment, for security and reliability, the operating system may prevent direct communication between independent processes, providing strictly mediated and controlled inter-process communication functionality.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

The invention claimed is:

1. A computer-implemented method of managing account data using an application instance, the method comprising:
generating a plurality of visibility groups comprising at least a first visibility group and a second visibility group, wherein the first visibility group corresponds to a first set of different user privilege classes and the second visibility group corresponds to a second set of different user privilege classes, wherein the first set of different user privilege classes of the first visibility group include an internal users group, and wherein the second set of different user privilege classes of the second visibility group include at least i) the first set of different user privilege classes and ii) named external users;
generating a plurality of access modes comprising at least a first access mode and a second access mode, wherein the first access mode comprises a first set of access permissions assigned to the first visibility group and the second access mode comprises a second set of access permissions assigned to the second visibility group, wherein the first access mode is a private access mode, wherein the first set of access permissions assigned to the internal users group of the first visibility group are greater than the set of access permissions assigned to the named external users in the second visibility group, wherein the first set of access permissions are assigned to the first set of different user privilege classes of the first visibility group and are extended to the subset of the second set of the different user privilege classes of the second visibility group such that a change in the first access mode is automatically extended to a change in the second access mode;
selecting, via a graphical user interface (GUI), an access mode from the plurality of access modes, wherein upon selecting the access mode, a subset of access permissions corresponding to each of the plurality of visibility groups are determined;
at a computer system storing the account data in association with a group account, receiving a request to grant an external user access to a particular data record of the account data, wherein the particular data record comprises incident data in a supply chain, wherein a plurality of internal user accounts belong to the group account, and wherein the external user does not belong to the group account;
validating the request, by determining whether the external user can be granted access to the particular data record, wherein validating the request comprises:
determining the external user is associated with a given visibility group from the plurality of predetermined visibility groups based on a given user privilege class selected from the group consisting of internal users group, a named external users group, an invited or registered external users group and non-users group,
determining the particular data record is associated with the selected access mode,
determining the group account is associated with the given visibility group,
determining the subset of permissions for the external user based on the give visibility group and the selected access mode;
in response to determining that the external user can be granted access to the particular data record based on the subset of access permissions, generating and storing access data associating the external user with the particular data record,
granting the external user access to the particular data record based on the stored access data.

2. The method of claim 1, wherein
wherein the plurality of visibility groups further comprise a third visibility group comprising a third set of different user privilege classes including i) the second set of different user privilege classes and ii) invited or registered external users,
and wherein the plurality of visibility groups further comprise a fourth visibility group comprising a fourth set of different user privilege classes including the third set of different user privilege classes and iv) non users.

3. The method of claim 2,
wherein the plurality of access modes further comprise a third access mode comprising a third set of access permissions assigned to the third visibility group, wherein the second set of access permissions assigned to named external users in the second visibility group are greater than the third set of access permissions assigned to the invited or registered external users in the third visibility group; or
wherein the plurality of access modes further comprise a fourth access mode comprising a fourth set of access permissions assigned to the fourth visibility group, wherein the third set of access permissions assigned to invited or registered external users in the third visibility group are greater than the fourth set of access permissions assigned to the non users in the fourth visibility group, and wherein the fourth access mode is a no login required access mode.

4. The method of claim 1, wherein granting the external user access to the particular data record comprises:
generating an access link associated with the external user and the particular data record, wherein the access link is a unique web link that is generated for the external user and the particular data record; and
sending the access link to the external user over a network.

5. The method of claim 4, further comprising:
receiving a request to revoke access privileges for the particular data record from the external user; and
responsive to receiving the request to revoke access privileges for the particular data record, invalidating the access link associated with the external user and the particular data record.

6. The method of claim 5, further comprising:
in response to receiving a request, via the access link, to access the particular data record:
determining that the access link is no longer a valid access link; and
in response to determining that the access link is no longer a valid access link, denying the request to access the particular data record.

7. The method of claim 1, further comprising:
receiving a request to revoke access privileges to the particular data record from the external user; and
responsive to receiving the request to remove access privileges, deleting the stored access data associating the external user with the particular data record.

8. The method of claim 1, further comprising:
receiving a request to grant a second external user access to the particular data record, wherein:
the second external user is associated with a particular visibility group; and
the external access settings associated with the group account deny access to the particular visibility group;
attempting to validate the request to grant the second external user access to the particular data record;
determining that the external access settings associated with the group account do not permit the second external user to access the particular data record; and
denying the request to grant the second external user access to the particular record.

9. The method of claim 1, further comprising:
receiving a second request to allow the external user to modify the particular data record,
determining whether the external user has privileges to modify the particular data record, and
in response to determining that the external user does not have the privileges to modify the particular data record, denying the second request.

10. The method of claim 3, wherein:
the first set of access permissions assigned to the internal users group of the first visibility group include create, edit, and comment permissions, and the set of access permissions assigned to the named external users in the second visibility group do not include the create permission; or wherein:
the first set of access permissions assigned to the named external users in the first visibility group edit and comment permissions and the set of access permissions assigned to the invited or registered external users in the second visibility group do not include the edit permission.

11. The method of claim 1, further comprising:
presenting a graphical user interface to a user comprising:
a first field allowing the user to select a group account;
a second field allowing the user to select a data record associated with the selected group account;
a third field listing internal users and external users associated with the selected data record; and
one or more controls for performing at least one of the following: viewing incident details, creating a new incident, or unfollowing an incident.

12. The method of claim 1,
wherein the graphical user interface (GUI) is presented to an administrator user and wherein the GUI displays:
a first field allowing the administrator user to select a user group;
a second field allowing the administrator user to select user within the selected user group; and
one or more controls for performing at least one of the following: adding a new internal user, adding a new named external user, creating a visibility group, removing a visibility group, adding a named external user to a visibility group, removing a named external user form a visibility group, promoting an external user to a named external user, demoting an external user to a guest user, deleting a user, or promoting a user to an internal user.

13. The method of claim 4, wherein the access link received at a browser on a computing device of the external user provides an interface at the browser to access the particular data record.

14. The method of claim 4, further comprising:
responsive to a subsequent request by the external user to access the particular data record via the access link, determining whether the access link and user credentials associated with the external user are valid.

15. One or more non-transitory storage media storing instructions which, when executed by one or more computing devices, cause performance of a method of managing account data using an application instance, the method comprising:
generating a plurality of visibility groups comprising at least a first visibility group and a second visibility group, wherein the first visibility group corresponds to a first set of different user privilege classes and the second visibility group corresponds to a second set of different user privilege classes, wherein the first set of different user privilege classes of the first visibility group include an internal users group, and wherein the second set of different user privilege classes of the second visibility group include at least i) the first set of different user privilege classes and ii) named external users;

generating a plurality of access modes comprising at least a first access mode and a second access mode, wherein the first access mode comprises a first set of access permissions assigned to the first visibility group and the second access mode comprises a second set of access permissions assigned to the second visibility group, wherein the first access mode is a private access mode, wherein the first set of access permissions assigned to the internal users group of the first visibility group are greater than the set of access permissions assigned to the named external users in the second visibility group, wherein the first set of access permissions are assigned to the first set of different user privilege classes of the first visibility group and are extended to the subset of the second set of the different user privilege classes of the second visibility group such that a change in the first access mode is automatically extended to a change in the second access mode;

selecting, via a graphical user interface (GUI), an access mode from the plurality of access modes, wherein upon selecting the access mode, a subset of access permissions corresponding to each of the plurality of visibility groups are determined;

at a computer system storing the account data in association with a group account, receiving a request to grant an external user access to a particular data record of the account data, wherein the particular data record comprises incident data in a supply chain, wherein a plurality of internal user accounts belong to the group account, and wherein the external user does not belong to the group account;

validating the request, by determining whether the external user can be granted access to the particular data record, wherein validating the request comprises:

determining the external user is associated with a given visibility group from the plurality of visibility groups based on a given user privilege class associated with the external user, wherein the given user privilege class is selected from the group consisting of internal users group, a named external users group, an invited or registered external users group and non-users group, determining the particular data record is associated with the selected access mode, determining the group account is associated with be given visibility group, determining the subset permissions for the external user based on the given visibility group and the selected access mode;

in response to determining that the external user can be granted access to the particular data record based on the subset of access permissions, generating and storing access data associating the external user with the particular data record, granting the external user access to the particular data record based on the stored access data.

16. The one or more non-transitory storage media of claim 15, wherein the plurality of visibility groups further comprise a third visibility group comprising a third set of different user privilege classes including i) the second set of different user privilege classes ii) invited or registered external users, and wherein the plurality of visibility groups further comprise a fourth visibility group comprising a fourth set of different user privilege classes including i) the third set of different user privilege classes and ii) non users.

17. The one or more non-transitory storage media of claim 16, wherein the plurality of access modes further comprise a third access mode is comprising a third set of access permissions assigned to the third visibility group, wherein the second set of access permissions assigned to the named external users in the second visibility group are greater than the third set of access permissions assigned to the invited or registered external users in the third visibility group; or wherein the plurality of access modes further comprise a fourth access mode comprising a fourth set of access permissions assigned to the third visibility group, wherein the third set of access permissions assigned to invited or registered external users in the third visibility group are greater than the fourth set of access permissions assigned to the non users in the fourth visibility group, and wherein the fourth access mode is a login required access mode.

18. The one or more non-transitory storage media of claim 17, wherein:

the first set of access permissions assigned to the internal users group of the first visibility group include create, edit, and comment permissions, and the second set of access permissions assigned to the named external users in the second visibility group do not include the create permissions; or wherein:

the first set of access permissions assigned to the named external users in the first visibility group edit and comment permissions and the set of access permissions assigned to the invited or registered external users in the second visibility group do not include the permission.

* * * * *

UNITED STATES PATENT AND TRADEMARK OFFICE
CERTIFICATE OF CORRECTION

| | | |
|---|---|---|
| PATENT NO. | : 12,204,667 B2 | Page 1 of 1 |
| APPLICATION NO. | : 16/941382 | |
| DATED | : January 21, 2025 | |
| INVENTOR(S) | : Matthew S. Malden, Nader Mikhail and David Blonski | |

It is certified that error appears in the above-identified patent and that said Letters Patent is hereby corrected as shown below:

In the Claims

Column 26, Line 49, Claim 1 "user based on the give" should read --user based on the given--

Column 26, Line 58, Claim 2 "The method of claim 1, wherein wherein" should read --The method of claim 1, wherein--

Signed and Sealed this
Twenty-fifth Day of February, 2025

Coke Morgan Stewart
*Acting Director of the United States Patent and Trademark Office*